Figure 1:
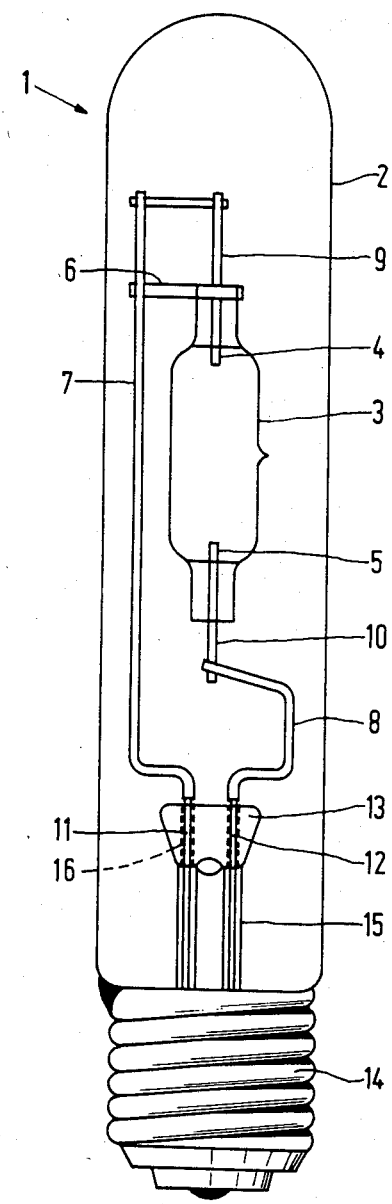

United States Patent [19]

Dohmen

[11] Patent Number: 4,691,142
[45] Date of Patent: Sep. 1, 1987

[54] ELECTRIC LAMP AND GLASS COMPOSITION

[75] Inventor: Petrus J. M. Dohmen, Eindhoven, Netherlands

[73] Assignee: U.S. Philips Corporation, New York, N.Y.

[21] Appl. No.: 772,240

[22] Filed: Sep. 3, 1985

[30] Foreign Application Priority Data

Sep. 19, 1984 [NL] Netherlands .................... 8402866

[51] Int. Cl.$^4$ .................. C03C 3/093; C03C 3/066; H01J 17/18; H01J 61/36
[52] U.S. Cl. ........................... 313/623; 501/67; 501/79
[58] Field of Search ............ 313/623; 501/67, 79

[56] References Cited

U.S. PATENT DOCUMENTS

| | | | |
|---|---|---|---|
| 4,152,282 | 5/1979 | Baudry et al | 501/79 |
| 4,323,652 | 4/1982 | Baudry et al. | 501/79 |
| 4,385,127 | 5/1983 | Chyung | 501/79 |

Primary Examiner—Mark L. Bell
Attorney, Agent, or Firm—Norman N. Spain

[57] ABSTRACT

The invention relates to a glass composition which can be used as an intermediate glass for sealing tunsten current supply wires in borosilicate glass, for example, for use in discharge lamps. The intermediate glass has a coefficient of expansion of from 38 to $44.10^{-7}$ K$^{-1}$ and does not contain any sodium oxide, potassium oxide and lead oxide. Favorable thermal properties are obtained if the composition of the intermediate glass is kept within narrow limits.

The invention also relates to an electric lamp in which the intermediate glass is used.

3 Claims, 2 Drawing Figures

U.S. Patent   Sep. 1, 1987   4,691,142

ELECTRIC LAMP AND GLASS COMPOSITION

The invention relates to an electric lamp comprising a glass lamp envelope and current supply wires which comprise tungsten, which are led through the wall of the lamp envelope in a vacuum-tight manner and which have a coating of an intermediate glass over at least that part of their length which extends through the wall of the lamp envelope, which coating is fused with the glass of the lamp envelope, which intermediate glass comprises at least $SiO_2$, $B_2O_3$ and $Al_2O_3$ and which, apart from small amounts of impurities, is free from sodium oxide, potassium oxide and lead oxide.

The invention also relates to a glass composition which can be used as an intermediate glass coating for tungsten-containing current supply wires at the location where they are led through a borosilicate-glass envelope.

An electric lamp as described above is known from British Patent Specification GB 2064216B. The lamp envelope shown in the specification consists of quartz glass having a coefficient of expansion of approximately $7.10^{-7} K^{-1}$. The intermediate glass contains more than 80% by weight of $SiO_2$ and has a linear coefficient of expansion of from 11 to $17.10^{-7} K^{-1}$ in the temperature range of from 30° to 800° C.

In the electric lamp in accordance with the British Patent Specification, the current supply wires extend to a tungsten electrode or auxiliary electrode. However, the current supply wires may also extend to a discharge envelope of quartz glass or ceramics which is provided with current supply wires, in which case the lamp envelope acts as a second, outer envelope. Examples of such electric lamps are discharge lamps, such as low- and high-pressure metal vapour discharge lamps (for example, sodium or mercury vapour discharge lamps), metal halide vapour discharge lamps (mercury-metal iodide discharge lamps) and halogen incandescent lamps. In such lamps with a double envelope, the outer lamp envelope generally does not consist of quartz glass. If tungsten wires are used for supplying the current through the outer envelope, it is to be preferred to manufacture at least that part of the lamp envelope which accommodates the current supply wires of a kind of glass whose coefficient of expansion differs little from that of tungsten ($45.10^{-7} K^{-1}$). Suitable types of glass are, for example, borosilicate glasses having a coefficient of expansion of from 35 to $41.10^{-7} K^{-1}$ in the temperature range between 0° and 300° C.

In order to be able to manufacture an electric lamp having a lamp envelope which consists at least partly of borosilicate glass and which has tungsten current supply wires, it is efficient to use an intermediate glass which over a temperature range of from 0° to 300° C. has a linear coefficient of expansion in the range of from 38 to $44.10^{-7} K^{-1}$. Customarily, the tungsten wires and the lamp envelope are coated with the same or a similar type of borosilicate glass. Generally, such glasses comprise sodium oxide and/or potassium oxide. In order to properly bond the tungsten wires to the glass, the tungsten wires are preoxidized before the coating is applied. It has been found that during fusing of coated tungsten wires into a lamp envelope, gas bubbles may develop at the interface of tungsten and glass under the influence of water or water vapour. During operation of the lamp these gas bubbles give rise to the development of leaks and they shorten the life of the lamp. This problem arises particularly if the coated tungsten wires have been stored for some time before use. It is caused by a reaction between sodium oxide and/or potassium oxide from the glass and tungsten oxide, resulting in the formation of a water-soluble tungstate. In order to avoid intrusion of water or water vapour, it is efficient to prevent the formation of tungstates at the interface of tungsten and intermediate glass by using an intermediate glass which is free of sodium oxide and potassium oxide. Advantageously, the intermediate glass also does not contain any lead oxide, which makes it possible to melt the glass in a reducing environment without metallic lead being formed. Moreover, glass compositions which do not contain sodium oxide, potassium oxide and/or lead oxide, generally exhibit a strong degree of crystallization when treated at high temperatures; moreover they have less favourable thermal properties.

It is the object of the invention to provide an electric lamp and an intermediate glass, in which the intermediate glass has a coefficient of expansion between 38 and $44.10^{-7} K^{-1}$ over the temperature range of from 0° to 300° C., which intermediate glass is free from sodium oxide, potassium oxide and lead oxide while having suitable thermal properties. These thermal properties have to meet the following requirements. In order to enable a tungsten wire with an intermediate glass coating to be fused with a lamp envelope of borosilicate glass, it is efficient that the annealing temperature of the intermediate glass is between 550° and 650° C. and that the softening point is between 750° and 820° C. The annealing temperature is defined herein as the temperature at which the viscosity of the glass is $10^{13.6}$ Pa.s, and the softening point as the temperature at which the viscosity of the glass is $10^{6.6}$ Pa.s. Furthermore, the glass should preferably not crystallize at a temperature below 850° C.

This object is accomplished in accordance with the invention by an electric lamp of the kind described in the opening paragraph, which is characterized in that at least that part of the lamp envelope through which the current supply wires extend inward is made of borosilicate glass and the intermediate glass comprises the following components in the specified quantities in % by weight:

| $SiO_2$ | 35–41 | MgO | 4–10 |
|---|---|---|---|
| $B_2O_3$ | 12–18 | CaO | 2–6 |
| $Al_2O_3$ | 12–18 | BaO + SrO | 2–10 |
| ZnO | 10–22 | $Sb_2O_3$ | 0–0.5 | and the balance, if any, consists of compatible components. In a preferred embodiment of the electric lamp in accordance with the invention, the intermediate glass comprises the following components in the specified quantities in % by weight:

| $SiO_2$ | 35–40 | MgO | 4–10 |
|---|---|---|---|
| $B_2O_3$ | 12–14 | CaO | 2–6 |
| $Al_2O_3$ | 15–18 | BaO + SrO | 2–5 |
| ZnO | 15–22 | $Sb_2O_3$ | 0–0.5 | and the balance, if any, consists of compatible components.

Such glass compositions have a relatively low coefficient of expansion of from 38 to $41.10^{-7} K^{-1}$ and they bond very well to the tungsten wires.

Figure 2:
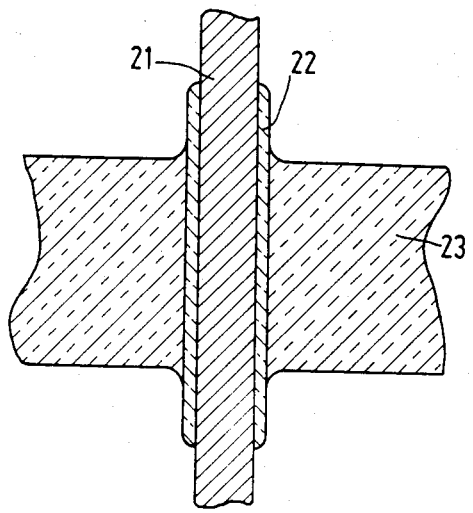

Embodiments of the invention will now be described in greater detail with reference to the drawing and the table of data that follows. In the drawing:

FIG. 1 is a plan view of a discharge lamp having a double envelope in accordance with the invention, and FIG. 2 is a sectional view of part of an electric lamp in accordance with the invention.

EMBODIMENT OF AN ELECTRIC LAMP IN ACCORDANCE WITH INVENTION

FIG. 1 shows a discharge lamp 1 having a lamp envelope 2 of borosilicate glass and a discharge vessel 3 of quartz glass. The discharge vessel 3 comprises two tunsten electrodes 4 and 5 which are positioned opposite each other. The discharge vessel 3 contains a quantity of a metal, for example mercury, which vapourizes during operation of the lamp and a quantity of an ignition gas, for example argon, at a pressure of 2000 Pa. Furthermore, the discharge vessel 3 may contain one or more metal halides. The discharge vessel 3 is connected to a conductor 7 by means of a support 6. An electrically conductive connection between the electrodes 4 and 5 and stainless steel conductors 7 and 8, respectively, is established by means of tungsten current supply wires 9 and 10. The conductors 7 and 8 are connected to tungsten current supply wires 11 and 12 which are led out of the lamp envelope 2 through a pinch 13 and which are respectively in electrically conductive contact with a cap 14. The pinch 13 is part of the glass-shaping tube 15 by means of which the lamp envelope 2 is sealed. The position of the intermediate glass coating is indicated on the current supply wires 11 and 12, which are accommodated in the pinch 13, by means of dashed lines 16.

A discharge lamp of the type described herein, in which, however, no intermediate glass is used for the current supply wires in the outer lamp envelope, is described, for example, in U.S. Pat. No. 3,234,421. Naturally, the invention can also be applied to other lamps in which a tungsten current supply wire has to be guided through a borosilicate glass envelope.

FIG. 2 shows a sectional view of a tungsten current supply wire 21 having an intermediate glass coating 22 in accordance with the invention. A portion 23 of the borosilicate glass lamp envelope is fused with the coating between the ends of the said coating 22. The coating 22 may be deposited, for example, from a suspension after which it is heated to form a homogeneous layer. It is also possible to manufacture a tube from the intermediate glass, which tube is slid onto the current supply wire and subsequently fused on.

Glass compositions in accordance with the invention and glass compositions for comparison The following table lists a number of glass compositions with some of their properties. These glass compositions are prepared to a usual manner by jointly melting the constituent oxides of the corresponding carbonates in a platinum crucible. The compositions 1 up to and including 6 are glass compositions in accordance with the invention, VII to IX are glass compositions for comparison, which are not in accordance with the invention.

The compositions listed in the Table are indicated in % by weight of the constituent oxides. The coefficient of expansion is indicated in $10^{-7} K^{-1}$ and should, in accordance with the invention, be between 38 and $44.10^{-7} K^{-1}$. The annealing temperature and the softening point (in °C.) are determined by measurements of the viscosity of the glass. The temperature range over which crystallization occurs is determined by means of differential thermal analysis and this temperature range should preferably be over 850 Celsius degrees. The borosilicate glass which is used for the lamp envelope is, for example, of the following composition: 72,2% by weight of $SiO_2$, 17,1% of weight of $B_2O_3$, 2,6% by weight of $Al_2O_3$, 5,6% by weight of $Na_2O$, 1,4% by weight of $K_2O$, 0,3% by weight of MgO and 0,8% by weight of CaO. The coefficient of expansion of the said borosilicate glass is $39.10^{-7} K^{-1}$.

Glass compositions 1 to 6 meet the requirements. Glasses 5 and 6 are preferred embodiments with a low coefficient of expansion. Glass composition VII contains insufficient $Al_2O_3$ and too much BaO, the coefficient of expansion is too high, the crystallization temperature is too low and after fusion with the borosilicate glass an undesirable compressive stress develops. Glass composition VIII contains insufficient $Al_2O_3$ and its coefficient of expansion is too high. Glass composition IX contains insufficient $Al_2O_3$ and too much $B_2O_3$. This glass also has too high a coefficient of expansion and it exhibits an undesirable compressive stress after fusion with the borosilicate glass.

TABLE

| | in accordance with the invention | | | | | | not in accordance with the invention | | |
|---|---|---|---|---|---|---|---|---|---|
| | 1 | 2 | 3 | 4 | 5 | 6 | VII | VIII | IX |
| % by weight: | | | | | | | | | |
| $SiO_2$ | 39.7 | 39.8 | 39.8 | 39.8 | 39.8 | 39.8 | 36.6 | 37.3 | 38.6 |
| $B_2O_3$ | 14.5 | 14.5 | 14.5 | 15.6 | 13.6 | 13.6 | 16.8 | 16.4 | 20.0 |
| $Al_2O_3$ | 14.9 | 14.9 | 14.9 | 14.9 | 15.9 | 15.9 | 8.3 | 11.8 | 9.6 |
| MgO | 7.5 | 8.5 | 9.5 | 7.5 | 7.0 | 6.0 | 4.6 | 4.4 | 4.4 |
| CaO | 2.3 | .3.3 | 3.3 | 3.3 | 2.8 | 2.3 | 5.5 | 5.3 | 5.2 |
| BaO | 4.1 | 3.1 | 3.1 | 3.1 | 3.1 | 2.6 | 13.8 | 9.9 | 7.8 |
| SrO | 2.0 | 1.0 | 0.0 | 0.0 | 0.0 | 0.0 | 0.0 | 0.0 | 0.0 |
| ZnO | 14.4 | 14.4 | 14.4 | 17.3 | 17.3 | 19.3 | 13.8 | 14.3 | 14.0 |
| $Sb_2O_3$ | 0.25 | 0.25 | 0.25 | 0.25 | 0.25 | 0.25 | 0.25 | 0.25 | 0.25 |
| Coefficient of expansion ($10^{-7}K^{-1}$) | 42.5 | 44.0 | 43.5 | 41.5 | 40.5 | 38.5 | 58.0 | 48.0 | 52.0 |
| annealing temperature (°C.) | 643 | 632 | 639 | — | — | 620 | 616 | 614 | — |
| Softening point (°C.) | 807 | 796 | 801 | — | — | 805 | — | 769 | — |
| Lowest temperature at which crystallization occurs | 900 | — | — | — | — | 900 | 710 | 900 | — |

What is claimed is:

1. An electric lamp comprising a glass envelope and tungsten-current supply wires, which wires are led through the wall of the lamp envelope in a vacuum-tight manner and which have a coating of an intermediate glass over at least that part of their lengths which extends through the wall of the lamp envelope, which coating is fused with the glass of the lamp envelope, which intermediate glass contains $SiO_2$, $B_2O_3$, and $Al_2O_3$ and which, apart from small amounts of impurities, is free from sodium oxide, potassium oxide and lead oxide, characterized in that at least that part of the lamp envelope through which the current supply wires extend inward is made of borosilicate glass and the intermediate glass consists essentially of the following components in the following specified quantities in % by weight:

| | | | |
|---|---|---|---|
| $SiO_2$ | 35–41 | MgO | 4–10 |
| $B_2O_3$ | 12–18 | CaO | 2–6 |
| $Al_2O_3$ | 12–18 | BaO + SrO | 2–5 |
| ZnO | 10–22 | $Sb_2O_3$ | 0–0.5 |

2. An electric lamp as claimed in claim 1, characterized in that the intermediate glass consists essentially of the following components in the following specified quantities in % by weight:

| | | | |
|---|---|---|---|
| $SiO_2$ | 35–40 | MgO | 4–10 |
| $B_2O_3$ | 12–14 | CaO | 2–6 |
| $Al_2O_3$ | 15–18 | BaO + SrO | 2–5 |
| ZnO | 15–22 | $Sb_2O_3$ | 0–0.5 | and the balance, if any, consists of compatible components.

3. A glass composition particularly adopted for use as an intermediate glass coating for tungsten-containing current supply wires at the location where these wires are led through a borosilicate-glass envelope, of an electric lamp characterized in that the intermediate glass consists essentially of the following components in the following specified quantities in % by weight:

| | | | |
|---|---|---|---|
| $SiO_2$ | 35–40 | MgO | 4–10 |
| $B_2O_3$ | 12–14 | CaO | 2–6 |
| $Al_2O_3$ | 15–18 | BaO + SrO | 2–5 |
| ZnO | 15–22 | $Sb_2O_3$ | 0–0.5. |

* * * * *